Patented Apr. 20, 1926.

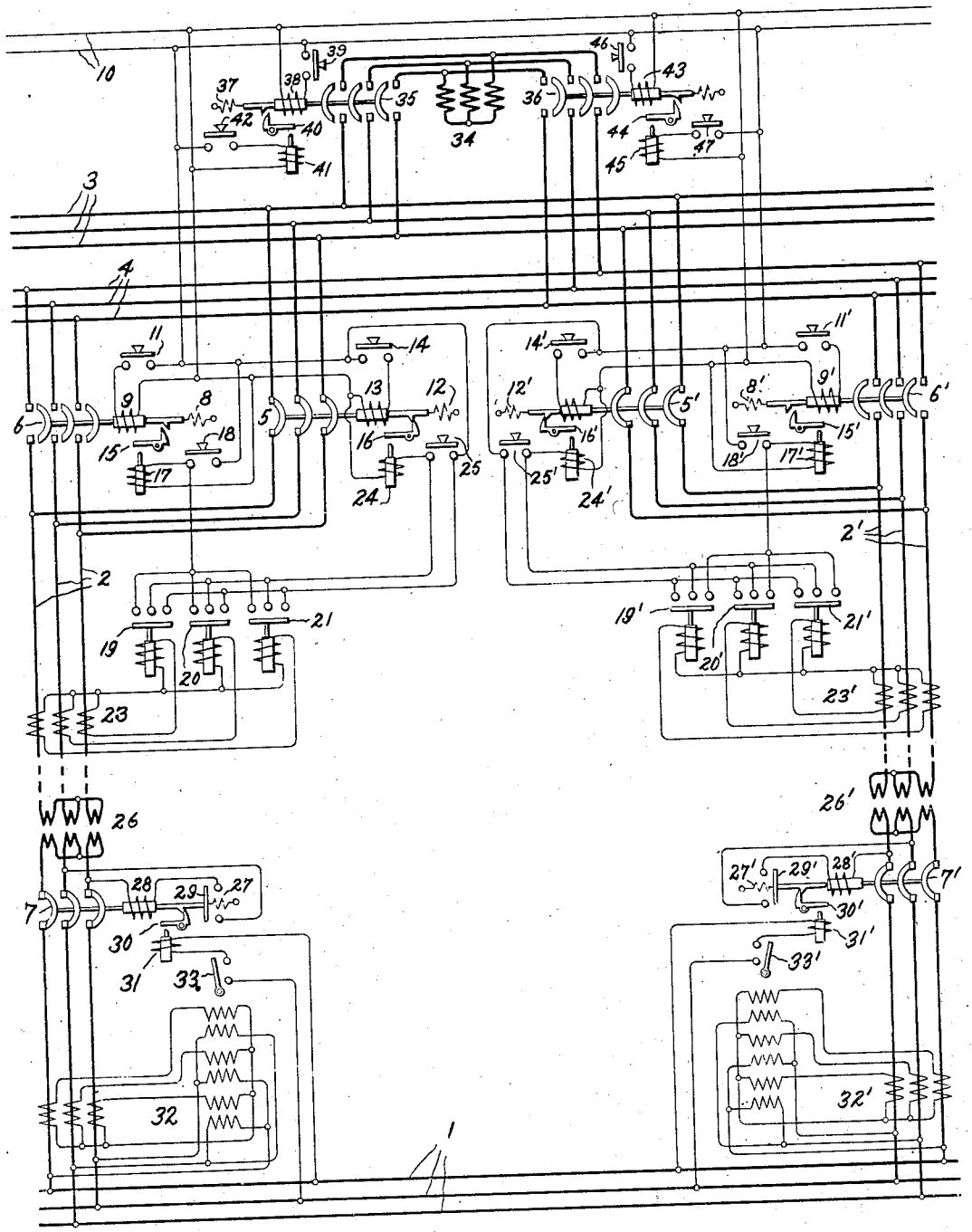

1,581,831

UNITED STATES PATENT OFFICE.

DAVID K. BLAKE, OF SCHENECTADY, NEW YORK, ASSIGNOR TO GENERAL ELECTRIC COMPANY, A CORPORATION OF NEW YORK.

ALTERNATING-CURRENT SECONDARY NETWORKS.

Application filed February 16, 1924. Serial No. 693,168.

*To all whom it may concern:*

Be it known that I, DAVID K. BLAKE, a citizen of the United States, residing at Schenectady, in the county of Schenectady, State of New York, have invented certain new and useful Improvements in Alternating-Current Secondary Networks, of which the following is a specification.

My invention relates to systems wherein a source of power is arranged to be interconnected with a distribution network through a plurality of feeders, and has for its object the provision of an improved means for controlling from a single point the connections at both ends of the feeders.

Where a secondary network is interconnected with a source of power through a plurality of feeders it is frequently desirable to remove one or more of the feeders from service, to permit repairing of the feeders or to reduce the core losses of the feeder transformers during light load periods. This involves opening switches at both ends of the feeder. To disconnect a feeder at the generating station or substation from which it is supplied, usually involves little difficulty due to the presence of an attendant at this point. For the purpose of disconnecting the feeder at its network end it has been proposed to provide a sensitive directional power relay specially constructed to operate in response to the feeder transformer magnetizing current which is supplied from the network when the feeder is disconnected at the station. I propose to provide means whereby the necessity of using a specially constructed relay is avoided. To this end a current limiting means is arranged to be connected across the station end of the feeder when it is disconnected from the main supply bus and the current supplied to this means is utilized to operate the power directional relay by which operation of the switch at the network end of the feeder is controlled. This arrangement has the advantage that the current limiting means may easily be designed to conduct sufficient current to insure prompt and positive action of the relay.

My invention will be better understood from the following description taken in connection with the accompanying drawing, and its scope will be pointed out in the appended claims.

Referring to the drawings there is shown in the single figure thereof a network comprising conductors 1 arranged to be supplied with current through feeders, 2 and 2' from main bus 3 and also arranged to be connected to the auxiliary bus 4. As the description proceeds it will become apparent that my invention is not limited to any particular number of feeders. The buses 3 and 4 may be located at the generating station or substation. Since the control equipments of the two feeders are alike, their corresponding parts will be indicated by the same numbers, unprimed numbers being applied to the equipment of feeder 2 and primed numbers being applied to the equipment of feeder 2'.

The feeder 2 is provided with a switch 5 for connecting it to the bus 3, with a switch 6 for connecting it to the bus 4 and with a switch 7 for connecting it to the network 1. The switch 6 is shown as provided with suitable means shown as a spring 8 for biasing it to open position and with an operating solenoid 9 arranged to be energized from the control circuit 10 in response to closure of the switch 11. The switch 5 is provided with a biasing spring 12 and an operating solenoid 13 arranged to be energized from the control circuit 10 in response to operation of the switch 14. Suitable means shown as latches 15 and 16 are provided for maintaining switches 9 and 13 respectively in closed position. A tripping solenoid 17 is arranged to trip out the switch 6 in response either to closure of the switch 18 or to closure of one or more of the over current relay switches 19, 20 and 21 which are interconnected with the feeder 2 through current transformers 23. The switch 5 is provided with a solenoid 24 for tripping it out in response either to closure of the switch 25 or to operation of the relay switches 19, 20, and 21. A transformer 26 is shown as connected in the feeder 2 at its network end.

The switch 7 is biased to open position by a spring 27 and is provided with a closing coil 28 for automatically closing the switch when the feeder is energized from the station end. Suitable means may be provided for delaying interruption of the circuit of coil 28 until the switch 7 is closed. The circuit of coil 28 is interrupted by the switch 29 upon closure of the switch 7. Suitable means shown as a tripping latch 30 and solenoid 31 are provided for tripping out the switch 7 in response to operation of the power directional relay 32 the moving member 33 of which is arranged to connect the trip coil 31 to the network 1 in response to the transmission of power from the network to the feeder. The power directional relay 32 is of a well-known form and its operation will be readily understood without further explanations.

A current limiting means which may be either a resistor or reactor 34 is arranged to be connected either to the bus 3 through switch 35 or to the bus 4 through switch 36. The switch 35 is illustrated as biased to open position by a spring 37 and is provided with a closing coil 38 arranged to be energized from the control circuit 10 by closure of switch 39 and with trip latch 40 and coil 41 operable in response to closure of the switch 42. The switch 36 is likewise provided with a closing coil 43 and with trip latch 44 and coil 45, the coil 43 being energized in response to closure of the switch 46 and the coil 45 being energized in response to operation of the switch 47.

As illustrated in the drawing the network 1 is connected to the bus 3 through both feeders 2 and 2'. To remove the feeder 2' from service the switch 5' is opened and switches 6' and 36 are closed thereby connecting the reactor 34 to the auxiliary bus 4 and connecting this bus to the feeder 2'. With these connections current is fed from the bus 3 through the feeder 2, the network 1, the feeder 2' and the bus 4 to the reactor 34 and the switch 7' is tripped out in response to operation of the power directional relay 32'. When it is desired to put the feeder 2' into service the switch 6' is opened and the switch 5' is closed thereby connecting the feeder 2 to the bus 3 and energizing the closing coil 28' of the switch 7' through which the feeder is connected to the network 1. The procedure to be followed in taking feeder 2 out of service and in placing it in service will be apparent from what has been said in connection with bus 2'.

In accordance with my invention any number of feeders at the same station may be placed in and removed from service by means of a single reactor although in its broader aspects my invention is not limited to the use of a single current limiting means. The reactor 34 is not limited to use in connection with any particular number of feeders nor with any given number of buses. If more than two buses are provided it will be evident that the provision of additional switches similar to switches 35 and 36 will make it possible to connect the reactor 34 across any one of the buses which may be dead and that switches similar to 5 and 6 may be provided for connecting the various feeders to the different buses.

The reactor 34 may be designed to take an amount of current sufficient to give the relay 32' a positive tripping action thereby rendering unnecessary the provision of a relay of special construction. If the feeder is designed for operation at 2300 volts and carries 1200 kv.-a., for example, it is a simple matter to design the reactor to take 500, 750, or 1000 kv.-a. This makes it possible to accommodate the value of the actuating current to the requirements of the relay instead of accommodating the relay to the very small magnetizing current of the feeder transformer and insures prompt and positive action of the switch when removing the feeder from service.

I have explained my invention by illustrating and describing a certain specific embodiment thereof, but it will be readily understood by those skilled in the art that the invention may be embodied in other forms than that shown and described. I, accordingly, do not wish to be restricted to the particular arrangement of switches and switch control circuits herein described, but intend, in the appended claims, to cover all changes and modifications within the true spirit and scope of my invention.

What I claim as new and desire to secure by Letters Patent of the United States, is:

1. An electric system wherein a source of current is arranged to be interconnected with a network through feeders equipped with switches for controlling their connections to said network and said source and wherein one of said feeders is provided with a power directional relay for controlling the operation of the switch by which it is connected to said network, comprising current limiting means, and means for disconnecting said feeder from said source and for connecting it to said current limiting means.

2. An electric system wherein a source of current is arranged to be interconnected with a network through feeders equipped with switches for controlling their connections to said network and said source and wherein one of said feeders is provided with a power directional relay for controlling the operation of the switch by which it is connected to said network, comprising a reactor, and switching means for disconnecting said feeder from said source and for connecting it to said reactor.

3. An electric system wherein a source of current is arranged to be interconnected with a network through feeders equipped with switches for controlling their connections to said source and said network and wherein one of said feeders is provided with a power directional relay for controlling the operation of the switch at one of its ends comprising current limiting means located at the other end of said feeder, and a switch for connecting said feeder to said current limiting means.

4. An electric system wherein a source of current is arranged to be interconnected with a network through a plurality of feeders each equipped at one end with a switch operable in response to actuation of a directional power relay and each provided with a switch for controlling its connection at the other end, comprising a current limiting means normally disconnected from said feeders, and switching means for interconnecting any one of said feeders with said current limiting means to complete a circuit for actuating its power directional relay.

In witness whereof, I have hereunto set my hand this 14th day of February 1924.

DAVID K. BLAKE.